US012107742B2

United States Patent
Arora et al.

(10) Patent No.: US 12,107,742 B2
(45) Date of Patent: Oct. 1, 2024

(54) MACHINE LEARNING TO ENHANCE SATELLITE TERMINAL PERFORMANCE

(71) Applicant: Hughes Network Systems, LLC, Germantown, MD (US)

(72) Inventors: Amit Arora, Clarksburg, MD (US); Kartik Seshadri, Boyds, MD (US); Sairaj Amberkar, Rockville, MD (US); Sonia Thakur, Germantown, MD (US); Namrata Walanj, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/900,676

(22) Filed: Aug. 31, 2022

(65) Prior Publication Data

US 2024/0073113 A1    Feb. 29, 2024

(51) Int. Cl.
*H04L 43/04*    (2022.01)
*G06F 18/214*    (2023.01)
(Continued)

(52) U.S. Cl.
CPC ............ *H04L 43/04* (2013.01); *G06F 18/214* (2023.01); *G06N 3/02* (2013.01); *G06N 20/00* (2019.01);
(Continued)

(58) Field of Classification Search
CPC ......... H04L 43/04; H04L 41/16; H04L 43/02; H04L 43/062; G06F 18/214; G06N 3/02; G06N 20/00
See application file for complete search history.

(56) References Cited

U.S. PATENT DOCUMENTS

| 1,133,599 A | 3/1815 | Winzer |
| 4,334,226 A | 6/1982 | Eguchi |

(Continued)

FOREIGN PATENT DOCUMENTS

| CN | 102487293 | 6/2012 |
| CN | 102487343 | 11/2014 |

(Continued)

OTHER PUBLICATIONS altexsoft.com [online], "How to Organize Data Labeling for Machine Learning: Approaches and Tools," available on Nov. 25, 2021, retrieved on Mar. 15, 2023, retrieved from URL: <https://www.altexsoft.com/blog/how-to-organize-data-labeling-for-machine-learning-approaches-and-tools/>, 30 pages.

(Continued)

*Primary Examiner* — Shirley X Zhang
(74) *Attorney, Agent, or Firm* — Fish & Richardson P.C.

(57) ABSTRACT

Methods, systems, and apparatus, including computer programs encoded on computer-storage media, for using machine learning to detect and correct satellite terminal performance limitations. In some implementations, a system retrieves data indicating labels for clusters of network performance anomalies. The system generates a set of training data to train a machine learning model, the set of training data being generated by assigning the labels for the clusters to sets of performance indicators used to generate the clusters. The system trains a machine learning model to predict classifications for communication devices based on input of performance indicators for the communication devices. The system determines a classification for the communication device based on output that the trained machine learning model generates.

18 Claims, 4 Drawing Sheets

(51) Int. Cl.
*G06N 3/02* (2006.01)
*G06N 20/00* (2019.01)
*H04B 7/185* (2006.01)
*H04L 41/16* (2022.01)
*H04L 43/02* (2022.01)
*H04L 43/062* (2022.01)
*H04W 24/04* (2009.01)

(52) U.S. Cl.
CPC ......... *H04B 7/18519* (2013.01); *H04L 41/16* (2013.01); *H04L 43/02* (2013.01); *H04L 43/062* (2013.01); *H04W 24/04* (2013.01)

(56) References Cited

U.S. PATENT DOCUMENTS

| | | |
|---|---|---|
| 6,021,383 A | 2/2000 | Domany et al. |
| 6,681,215 B2 | 1/2004 | Jammu |
| 8,706,025 B2 | 4/2014 | Mukhija |
| 8,892,484 B2 | 11/2014 | Sipple |
| 9,015,194 B2 | 4/2015 | Ziv et al. |
| 9,107,147 B1 | 8/2015 | Meng et al. |
| 9,122,602 B1 | 9/2015 | Jewell et al. |
| 9,349,001 B2 | 5/2016 | Gathala et al. |
| 9,449,279 B2 | 9/2016 | Verkasalo |
| 9,489,627 B2 | 11/2016 | Bala |
| 9,531,867 B2 | 12/2016 | Ouyang et al. |
| 9,558,056 B2 | 1/2017 | Sasturkar et al. |
| 9,602,345 B2 | 3/2017 | Saha et al. |
| 9,633,315 B2 | 4/2017 | Chapelle et al. |
| 9,634,945 B2 | 4/2017 | Stevens et al. |
| 9,704,054 B1 | 7/2017 | Tappen et al. |
| 9,813,147 B2 | 11/2017 | Baer et al. |
| 9,836,183 B1 | 12/2017 | Love et al. |
| 9,900,790 B1 | 2/2018 | Sheen et al. |
| 9,942,085 B2 | 4/2018 | Tsagkaris et al. |
| 10,003,605 B2 | 6/2018 | Muddu et al. |
| 10,038,707 B2 | 7/2018 | Muddu et al. |
| 10,044,620 B2 | 8/2018 | Dillon |
| 10,176,428 B2 | 1/2019 | Sridhara et al. |
| 10,212,091 B2 | 2/2019 | Ouyang et al. |
| 10,251,102 B2 | 4/2019 | Levinkron et al. |
| 10,318,886 B2 | 6/2019 | Baradaran et al. |
| 10,354,210 B2 | 7/2019 | Kour et al. |
| 10,375,590 B2 | 8/2019 | Bhagavatula et al. |
| 10,380,339 B1 | 8/2019 | Appalaraju et al. |
| 10,405,219 B2 | 9/2019 | Feldkamp |
| 10,433,208 B2 | 10/2019 | Gopal et al. |
| 10,448,585 B2 | 10/2019 | Kundra et al. |
| 10,454,753 B2 | 10/2019 | Sasturkar et al. |
| 10,594,027 B1 | 3/2020 | Arora et al. |
| 10,598,520 B2 | 3/2020 | Pal et al. |
| 10,616,257 B1 | 4/2020 | Soulhi et al. |
| 10,637,745 B2 | 4/2020 | Naous |
| 10,735,273 B2 | 8/2020 | Kaplunov et al. |
| 10,740,656 B2 | 8/2020 | Arora et al. |
| 10,778,547 B2 | 9/2020 | Halepovic |
| 10,797,938 B2 | 10/2020 | Tiwari et al. |
| 10,812,178 B2 | 10/2020 | Peponides |
| 10,833,954 B2 | 11/2020 | Carroll et al. |
| 10,903,554 B2 | 1/2021 | Arora et al. |
| 10,911,470 B2 | 2/2021 | Muddu et al. |
| 10,956,252 B2 | 3/2021 | Della Corte et al. |
| 10,979,307 B2 | 4/2021 | Nunna et al. |
| 11,134,016 B2 | 9/2021 | Arora et al. |
| 11,146,327 B2 | 10/2021 | Arora et al. |
| 11,150,974 B2 | 10/2021 | Velipasaoglu et al. |
| 11,165,684 B2 | 11/2021 | Krishnan et al. |
| 11,218,422 B2 | 1/2022 | Roy et al. |
| 11,335,996 B2 | 5/2022 | Arora et al. |
| 11,343,268 B2 | 5/2022 | Apostolopoulos |
| 11,429,821 B2 | 8/2022 | Arora et al. |
| 11,870,700 B2 | 1/2024 | Arora et al. |
| 2008/0021686 A1 | 1/2008 | Jojic et al. |
| 2014/0337277 A1 | 11/2014 | Asenjo et al. |
| 2015/0172096 A1 | 6/2015 | Sadovsky et al. |
| 2015/0324690 A1 | 11/2015 | Chilimbi et al. |
| 2015/0379427 A1 | 12/2015 | Dirac et al. |
| 2015/0379429 A1 | 12/2015 | Lee et al. |
| 2016/0037434 A1 | 2/2016 | Gopal et al. |
| 2016/0098291 A1 | 4/2016 | Kondaveeti et al. |
| 2016/0207458 A1 | 7/2016 | Pillai |
| 2016/0359719 A1 | 12/2016 | Travostino |
| 2017/0149813 A1 | 5/2017 | Wright et al. |
| 2017/0180214 A1 | 6/2017 | Azevedo et al. |
| 2018/0004197 A1 | 1/2018 | Feenstra et al. |
| 2018/0070527 A1 | 3/2018 | Richt |
| 2018/0181144 A1 | 6/2018 | Steinmann et al. |
| 2018/0232592 A1 | 8/2018 | Stewart et al. |
| 2018/0278486 A1 | 9/2018 | Mermoud et al. |
| 2018/0278487 A1 | 9/2018 | Mermoud et al. |
| 2018/0316707 A1 | 11/2018 | Dodson et al. |
| 2019/0019061 A1 | 1/2019 | Trenholm et al. |
| 2019/0036789 A1 | 1/2019 | Kaplunov et al. |
| 2019/0042885 A1 | 2/2019 | Han |
| 2019/0068443 A1 | 2/2019 | Li et al. |
| 2019/0196894 A1 | 6/2019 | Cherbakov et al. |
| 2019/0200244 A1 | 6/2019 | Polepalli |
| 2019/0239101 A1 | 8/2019 | Ouyang et al. |
| 2019/0258756 A1 | 8/2019 | Minwalla et al. |
| 2019/0281476 A1 | 9/2019 | Lyon et al. |
| 2019/0335342 A1 | 10/2019 | Jacinto et al. |
| 2019/0342183 A1 | 11/2019 | Nunna et al. |
| 2020/0073742 A1 | 3/2020 | Amora et al. |
| 2020/0090009 A1* | 3/2020 | Arora ...................... G06F 18/23 |
| 2020/0136975 A1 | 4/2020 | Arora et al. |
| 2020/0194876 A1 | 6/2020 | Amora et al. |
| 2020/0204860 A1 | 6/2020 | Gerszberg et al. |
| 2020/0210885 A1 | 7/2020 | Arora et al. |
| 2020/0328804 A1 | 10/2020 | Xu et al. |
| 2020/0379454 A1* | 12/2020 | Trinh ................... G05B 23/024 |
| 2020/0410300 A1 | 12/2020 | Arora et al. |
| 2021/0019648 A1 | 1/2021 | Zhang |
| 2021/0143532 A1 | 5/2021 | Arora et al. |
| 2022/0014471 A1 | 1/2022 | Arora et al. |
| 2023/0179479 A1 | 6/2023 | Gibbon et al. |

FOREIGN PATENT DOCUMENTS

| | | |
|---|---|---|
| CN | 104268381 | 3/2017 |
| WO | WO 2020/047130 | 3/2020 |
| WO | WO 2020/060669 | 3/2020 |

OTHER PUBLICATIONS

Al-Zaidy et al., "Data-driven models for satellite state-of-health monitoring and evaluation," International Journal of Robotics and Mechatronics, May 2018, 5(1): 1-12.

Asano et al., "Self-Labelling via Simultaneous Clustering and Representation Learning," CoRR, Submitted on Feb. 2020, arXiv: 1911.05371, 22 pages.

Barua et al., "A Diagnostic Tree Approach for Fault Cause Identification in the Attitude Control Subsystem of Satellites," IEEE Transactions on Aerospace and Electronic Systems, Jul. 2009, 45(3):983-1002.

Beil et al., "Cluster-Clean-Label: An interactive Machine Learning approach for labeling high-dimensional data," Presented at the Proceedings of the 13th International Symposium on Visual Information Communication and Interaction, Eindhoven, North Brabant, Netherlands, Dec. 2020, 8 pages.

cloudfactory.com [online], "Mastering data labeling for ML in 2024: A comprehensive guide," available on or before Aug. 11, 2022, via Internet Archive: Wayback Machine URL <https://web.archive.org/web/20220308194930/https://www.cloudfactory.com/data-labeling-guide>, retrieved on Mar. 16, 2024, URL <https://www.cloudfactory.com/data-labeling-guide>, 23 pages.

cloudfactory.com [online], "The Ultimate Guide to Data Labeling for Machine," available on Aug. 18, 2022, retrieved on Aug. 18, 2022, URL<https://www.cloudfactory.com/data-labeling-guide>, 37 pages.

(56) References Cited

OTHER PUBLICATIONS

Esling, "Clustering for Classification: Using Unsupervised Learning for Label Expansion," Inquest, Dec. 2020, 5 pages.
Gao et al., "Fault detection and diagnosis for spacecraft using principal component analysis and support vector machines," Presented at 7th IEEE Conference on Industrial Electronics and Applications (ICIEA), Jul. 2012, pp. 1984-1988.
Haeusser et al., "Associative Deep Clustering: Training a Classification Network with no Labels," Presented at the Proceedings of Pattern Recognition: 40th German Conference, GCPR 2018, Stuttgart, Baden-Wurttemberg, Germany, Oct. 9-12, 2018, 9 pages.
ibm.com [online], "What is data labeling?" available on Aug. 5, 2021, retrieved on Aug. 18, 2022, retrieved from URL: <https://www.ibm.com/topics/data-labeling>, 9 pages.
iksinc.online [online], "How to Build a Labelled Training Data Set," available on Mar. 27, 2019, retrieved on Aug. 18, 2022, retrieved from URL: <https://iksinc.online/2019/3/27/how-to-build-a-labelled-training-data-set-with-a-few-labelled-examples/>, 4 pages.
imerit.net [online], "Machine Learning with Unlabeled Training Data," available on Jun. 1, 2021, retrieved from URL: <https://imerit.net/blog/machine-learning-with-unlabeled-training-data-all-pbm/>, 6 pages.
International Preliminary Report on Patentability in International Appln. No. PCT/US2019/043374, dated Apr. 1, 2021, 8 pages.
International Preliminary Report on Patentability in International Appln. No. PCT/US2019/048613, dated Mar. 11, 2021, 10 pages.
International Preliminary Report on Patentability in International Appln. No. PCT/US2019/057207, dated May 6, 2021, 13 pages.
International Search Report and Written Opinion in International Appln. No. PCT/US2019/043374, dated Oct. 24, 2019, 14 pages.
International Search Report and Written Opinion in International Appln. No. PCT/US2019/048613, dated Nov. 15, 2019, 17 pages.
International Search Report and Written Opinion in International Appln. No. PCT/US2019/057207, dated Feb. 12, 2020, 21 pages.
Invitation to Pay Additional Fees in International Appln. No. PCT/US2019/057207, dated Dec. 18, 2019, 15 pages.
Kaushik, "An Introduction to Clustering and Different Methods of Clustering," Analytics Vidhya, dated Nov. 3, 2016, 27 pages.
Landauer et al., "Dynamic log file analysis: An unsupervised cluster evolution approach for anomaly detection," Computers & Security, Elsevier Science, Sep. 4, 2018, 79:94-116.
machinelearningmastery.com [online], "Semi-Supervised Learning With Label Spreading," available on Jan. 4, 2021, retrieved on Aug. 18, 2022, retrieved from URL: <https://machinelearningmastery.com/semi-supervised-learning-with-label-spreading>, 18 pages.
McGregor, "8 Clustering Algorithms in Machine Learning that All Data Scientists Should Know," FreeCodeCamp, Sep. 2020, 20 pages.
Notice of Allowance in U.S. Appl. No. 16/118,836, mailed on Dec. 10, 2019, 5 pages.
Notice of Allowance in U.S. Appl. No. 16/118,836, mailed on Feb. 11, 2020, 4 pages.
Notice of Allowance in U.S. Appl. No. 16/118,836, mailed on Jan. 2, 2020, 2 pages.
Notice of Allowance in U.S. Appl. No. 16/118,836, mailed on Sep. 10, 2019, 8 pages.
Notice of Allowance in U.S. Appl. No. 16/135,182, mailed on Apr. 3, 2020, 9 pages.
Notice of Allowance in U.S. Appl. No. 16/172,021, mailed on May 27, 2021, 8 pages.
Notice of Allowance in U.S. Appl. No. 16/715,411, mailed on Sep. 18, 2020, 7 pages.
Notice of Allowance in U.S. Appl. No. 16/987,028, mailed on Apr. 20, 2022, 6 pages.
Notice of Allowance in U.S. Appl. No. 17/155,359, mailed on Jan. 21, 2022, 9 pages.
Notice of Allowance in U.S. Appl. No. 17/485,946, mailed on Oct. 5, 2023, 8 pages.
Office Action in European Appln. No. 19750001, mailed on Feb. 7, 2023, 5 pages.
Office Action in European Appln. No. 197696151 mailed on Oct. 2, 2023, 6 pages.
Office Action in European Appln. No. 19801164, mailed on Oct. 26, 2022, 8 pages.
Office Action in U.S. Appl. No. 16/118,836, mailed on May 15, 2019, 8 pages.
Office Action in U.S. Appl. No. 16/172,021, mailed on Jul. 1, 2020, 8 pages.
Office Action in U.S. Appl. No. 16/172,021, mailed on Nov. 17, 2020, 10 pages.
Office Action in U.S. Appl. No. 16/715,411, mailed on May 29, 2020, 11 pages.
Office Action in U.S. Appl. No. 16/987,028, mailed on Oct. 14, 2021, 7 pages.
Office Action in U.S. Appl. No. 17/155,359, mailed on Oct. 28, 2021, 8 pages.
Office Action in U.S. Appl. No. 17/485,946, mailed on Apr. 11, 2023, 10 pages.
Peikari et al., "A Cluster-then-label Semi-supervised Learning Approach for Pathology Image Classification," Scientific Reports, May 2018, 8(1):1-13.
stats.stackexchange.com [online], "How do you learn labels with unsupervised learning?," available on Aug. 30, 2021, retrieved on Aug. 19, 2022, retrieved from URL: <https//stats.stackexchange.com/questions/541889/how-do-you-learn-labels-with-unsupervised-learning>, 3 pages.
towardsdatascience.com [online], "Cluster-then-predict for classification tasks," available on Feb. 10, 2020, retrieved on Aug. 18, 2022, retrieved from URL: <https://towardsdatascience.com/cluster-then-predict-for-classification-tasks-142fdfdc87d6>, 13 pages.
what-when-how.com [Online] "SATCLUS: An Effective Clustering Technique for Remotely Sensed Images (Image Analysis)," 2011, retrieved on Nov. 27, 2018, retrieved from URL: <http://what-when-how.com/pattern-recognition-and-machineintelligence/satclus-an-effective-clustering-technique-for-remotely-sensed-images-image-analysis/>, 5 pages.
wikipedia.com [online], "Cluster analysis," available on or before Aug. 19, 2022, retrieved on Aug. 19, 2022, retrieved from URL: <https://en.wikipedia.org/wiki/Cluster analysis>, 22 pages.
Wurzenberger et al., "Incremental Clustering for Semi-Supervised Anomaly Detection applied on Log Data," ARES, Aug. 29, 2017, 6 pages.
Yin et al., "Satellite Fault Diagnosis Using Support Vector Machines Based on a Hybrid Voting Mechanism," The Scientific World Journal, Aug. 12, 2014, 2014(582042):1-11.
International Search Report and Written Opinion in International Application No. PCT/US2023/031507, mailed on Dec. 20, 2023, 14 pages.

\* cited by examiner

MACHINE LEARNING TO ENHANCE SATELLITE TERMINAL PERFORMANCE

BACKGROUND

The present specification relates to managing satellite terminals and other communication devices using machine learning. Modern networks and communication systems are very complex and experience widely varying conditions. In the case of satellite networks, performance can be affected by noise, interference, weather, network congestion, device configurations, and many other factors. In many cases, it can be challenging to identify or detect the types of performance limitations that are impacting a device and to select actions to improve performance.

SUMMARY

In some implementations, a system uses machine learning to automatically detect and correct issues that can limit performance in communication systems. For example, the system can use machine learning to perform automatic triage of very small aperture terminal (VSAT) site performance, to determine which terminals and sites are experiencing the most urgent or severe performance problems, as well as to determine for individual terminals or sites which types of problems are occurring. The system can then select and initiate configuration changes and other adjustments (e.g., performance-improving actions, corrective actions, etc.) that the system determines to be appropriate for terminals experiencing limited performance.

The system can use machine learning clustering to assign terminals to clusters that represent different situations or different status classifications of a terminal. At least some of the clusters correspond to performance limitations or other problems, and so assignment of a terminal to those clusters indicates that the terminal is experiencing the corresponding problem. Each cluster can also be associated with adjustment actions or workflows that can correct the problem associated with the cluster. As a result, when monitored information about a terminal causes the terminal to be assigned to a cluster representing impaired performance, the system can automatically initiate the adjustment actions or workflows associated with that cluster to improve or restore network performance of the terminal.

To train the machine learning components, the system can collect performance data from multiple terminals over time. Each of the terminals can periodically send many types of performance data, including traffic statistics, transmit queue statistics, measures of timing and delays, error counts, and more. In some implementations, the performance data is collected for key performance metrics or indicators from all terminals in a network. The performance data can include metrics from any or all layers of the network communication stack, e.g., the satellite transport layer, the IP transport and routing layer, the application layer, and so on. The system processes the performance data to classify the various metrics into discrete classifications, such as being "normal" (e.g., within a predetermined range that is typical for the performance measure), "low" (e.g., below the normal range for the performance measure), or "high" (e.g., above the normal range for the performance measure). For example, for each reported set of performance information from a terminal, the system can generate a vector that includes the classifications determined for the respective metrics reported by the terminal. This produces data sets (e.g., vectors) that each represent the state of a terminal at a particular time.

The training process then includes creating clusters of anomalous conditions that often occur together. For example, each cluster can include multiple types of anomalies, e.g., a set of conditions, representing indicators being high or low with respect to applicable references, that frequently occur together. The clustering of these types of anomalies can be used to discover causal relationships between combinations of performance metrics and network performance problems. In some cases, the system learns which indicator anomalies are related (e.g., part of the same problem or network condition) through analysis of large numbers of example data sets (e.g., thousands, tens of thousands, hundreds of thousands, millions, etc.), including examples from several networks and including examples occurring at different points over a significant period of time (e.g., weeks, months, etc.).

With the clusters of related types of anomalies (e.g., types of anomalous indicator values) generated, the system can generate visualizations of the clusters and the relationships among them. For example, the system can generate graphs and charts that plot or represent different indicator anomalies and clusters relative to each other. The spatial position of indicator anomalies in the chart or graph, or the distance of the anomalies to each other or connections between anomalies, can be set based on the frequency at which the anomalies occur together. For example, the more often that two indicator anomalies occur together (e.g., with the same type of indicator being abnormal, and in the same way), the closer the anomalies can be shown next to each other in the visualization. The visualizations can be presented to a human user that can label clusters to indicate the network problems they represent, such as "uplink transport problems", "heavy download usage", "heavy download usage with sub-optimal transport performance," etc.

The labels applied to the clusters are then applied back to the individual examples across the full repository, so that each data set or indicator report receives the label for the cluster that is most applicable. For example, the system can evaluate indicator reports to determine the types of anomalies indicated by each report. The system can also compare the set of anomalies in a report with the types of anomalies in each cluster. The indicator report can be assigned the label of the cluster for which there is the greatest amount of overlap, whether by an amount of anomaly types in common or a proportion of anomaly types in common. For example, if there are three clusters of anomalies, and an indicator report has 50% of the indicator anomalies of the first cluster, 60% of the indicator anomalies of the second cluster, and 70% of the indicator anomalies of the third cluster, the label for the third cluster can be applied to the indicator report. Each of the indicator reports, or the terminals providing the indicator reports, can be classified in this manner, so that the indicator reports in the repository are all labeled with the most likely network problem experienced.

With the large collection of labeled data (e.g., a variety of performance indicator reports and corresponding labels), the system trains one or more machine learning models that can predict, for individual terminals, the classification or cluster that best represents the situation for the terminal. Terminals that are monitored periodically send their performance data for a recent period (e.g., the last hour, the last 10 minutes, etc.), including metrics or indicators for many aspects of network communication. Measures of the terminal's network performance are provided as input to a trained machine learning model, and the model outputs a prediction of the appropriate classification for the current state of the terminal. From the classifications, the system can determine which terminals are experiencing communication problems, and which specific types of situations that are likely occurring. The system can then select and initiate adjustment actions to improve performance of terminals that have performance limitations. For example, the system can select actions to improve performance for individual terminals based on their respective classifications, using rules or other data to select the adjustment actions most appropriate for the classification of the terminal and/or the other information about the terminal.

In some implementations, a method includes: retrieving, by the one or more computers, data indicating labels for clusters of network performance anomalies, wherein each label for a cluster indicates a classification for a network condition associated with the network performance anomalies in the cluster; generating, by the one or more computers, a set of training data to train a machine learning model, the set of training data being generated by assigning the labels for the clusters to sets of performance indicators used to generate the clusters, the labels being assigned based on levels of commonality among the types of network performance anomalies indicated by respective sets of performance indicators and the types of network performance anomalies included in the respective clusters; training, by the one or more computers, a machine learning model predict classifications for communication devices based on input of performance indicators for the communication devices, wherein the machine learning model is trained to evaluate communication devices with respect to a predetermined set of classifications including the classifications for the clusters, and wherein the machine learning model is trained using training data examples from the set of training data in which each training example includes a set of performance indicators and the label assigned for the set of performance indicators; and for each of one or more communication devices, determining, by the one or more computers, a classification for the communication device based on output that the trained machine learning model generates based on input of performance indicators for the communication device.

In some implementations, the method includes managing, by the one or more computers, the one or more communication devices to automatically and selectively change operation or configuration of the one or more communication devices based on the respective classifications determined based on the output of the trained machine learning model.

In some implementations, the method includes storing rules that indicate different operation or configuration changes corresponding to different classifications in the predetermined set of classifications. Managing the one or more communication devices comprises, for a particular communication device of the one or more communication devices: using, by the one or more computers, an output of the trained machine learning model to determine a classification for the particular communication device; selecting, by the one or more computers, a change to operation or configuration of the particular communication device that the stored rules indicate for the determined classification for the particular communication device; and sending, by the one or more computers, an instruction to initiate the selected change for the particular communication device.

In some implementations, the method includes: periodically receiving performance indicator reports from each communication device in a set of communication devices; using the trained machine learning model to determine classifications for the communication devices based on the received indicator reports, wherein the determined classifications for each of multiple communication devices in the set of communication devices indicate network performance limitations; and for each of the multiple communication devices, selecting an adjustment action based on the classification for the communication device and automatically causing the selected adjustment action to be performed.

In some implementations, the communication system comprises a satellite network, wherein the communication devices for which the sets of performance indicators are obtained comprise very small aperture satellite terminals, and wherein the one or more communication devices are very small aperture satellite terminals.

In some implementations, training the machine learning model comprises using the label of each training example as a target output of the machine learning model for the training example.

In some implementations, assigning the labels for the clusters to the sets of performance indicators comprises: for each of multiple different sets of performance indicators: determining the types of anomalies indicated by the set of performance indicators; comparing the determined types of anomalies indicated by the set of performance indicators with the types of anomalies included in the respective clusters; based on the comparisons, identifying, from among the clusters, the cluster for which the set of performance indicators has the largest number or largest proportion of types of anomalies in common; and assigning the label for the identified cluster to the set of performance indicators.

In some implementations, determining the classifications for the one or more communication devices comprises: providing, as input to the machine learning model, feature scores based on performance indicators included in a performance indicator report of a particular communication device; and determining the classification for the particular communication device based on output that the machine learning model generates in response to receiving the feature scores as input.

In some implementations, the machine learning model comprises a deep neural network.

In some implementations, the machine learning model comprises at least one of a neural network, a support vector machine, a classifier, a regression model, a clustering model, a decision tree, a random forest model, a genetic algorithm, a Bayesian model, or a Gaussian mixture model.

In some implementations, the machine learning model is configured to output a set of scores including a score for each of the classifications in the predetermined set of classifications, wherein the scores indicate relative likelihoods that the respective classifications are appropriate given the input provided to the machine learning model.

In another general aspect, a method comprises: obtaining, by one or more computers, a set of performance indicators for each of multiple communication devices in a communication system; clustering, by the one or more computers, types of anomalies indicated by the performance indicators to generate clusters, wherein the types of anomalies are clustered based on levels of co-occurrence of the types of anomalies in the obtained sets of performance indicators; determining, by the one or more computers, labels for the clusters, wherein each label for a cluster indicates a classification for a network condition associated with the anomalies in the cluster; assigning, by the one or more computers, the labels for the clusters to the sets of performance indicators based on levels of commonality among the types of anomalies indicated by respective sets of performance indicators and the types of anomalies included in the respective clusters; training, by the one or more computers, a machine learning model to predict classifications for communication devices based on input of performance indicators for the communication devices, wherein the machine learning model is trained to evaluate communication devices with respect to a predetermined set of classifications including the classifications for the clusters, and wherein the machine learning model is trained using training data examples in which each training example includes a different set of performance indicators and the label assigned for the set of performance indicators; and for each of one or more communication devices, determining, by the one or more computers, a classification for the communication device based on output that the trained machine learning model generates based on input of performance indicators for the communication device.

In some implementations, the method includes managing, by the one or more computers, the one or more communication devices to automatically and selectively change operation or configuration of the one or more communication devices based on the respective classifications determined based on the output of the trained machine learning model.

In some implementations, the method includes storing rules that indicate different operation or configuration changes corresponding to different classifications in the predetermined set of classifications. Managing the one or more communication devices comprises, for a particular communication device of the one or more communication devices: determining a classification for the particular communication device based on output of the trained machine learning model; selecting a change to operation or configuration of the particular communication device based on the determined classification for the particular communication device; and sending an instruction to initiate the selected change for the particular communication device.

In some implementations, the method includes: periodically receiving performance indicator reports from each communication device in a set of communication devices; determining classifications for the communication devices based on the received indicator reports using the trained machine learning model, wherein the determined classifications for each of multiple communication devices in the set of communication devices indicates network performance limitations; and for each of the multiple communication devices, selecting an adjustment action based on the classification for the communication device and automatically causing the selected adjustment action to be performed.

In some implementations, the method includes the communication system comprises a satellite network, wherein the communication devices for which the sets of performance indicators are obtained are comprise very small aperture satellite terminals, and wherein the one or more communication devices are very small aperture satellite terminals.

In some implementations, training the machine learning model comprises using the label of each training example as a target output of the machine learning model for the training example.

In some implementations, the types of anomalies include, for each of multiple performance indicator types, (i) a type of anomaly in which an indicator value is below a normal range for the performance indicator type, and (ii) a type of anomaly in which the indicator value is above a normal range for the performance indicator type.

In some implementations, clustering the types of anomalies comprises: determining a measure of co-occurrence of different pairs of the types of anomalies in the sets of performance indicators; and clustering the types of anomalies based on the measures of co-occurrence of the different pairs of the types of anomalies.

In some implementations, assigning the labels for the clusters to the sets of performance indicators comprises: for each of multiple different sets of performance indicators: determining the types of anomalies indicated by the set of performance indicators; comparing the determined types of anomalies indicated by the set of performance indicators with the types of anomalies included in the respective clusters; based on the comparisons, identifying, from among the clusters, the cluster for which the set of performance indicators has the largest number or largest proportion of types of anomalies in common; and assigning the label for the identified cluster to the set of performance indicators.

In some implementations, the method includes: determining, for each of multiple performance indicator types, one or more reference values for the performance indicator type; and for each of the obtained sets of performance indicators, determining classifications for the performance indicators with respect to the reference values, the classification for each performance indicator being determined based on the stored one or more reference values corresponding to the performance indicator type for the performance indicator. Clustering of the sets of performance indicators is performed based on the determined classifications for the performance indicators.

In some implementations, the method includes: receiving, from a particular communication device, a performance indicator report that includes performance indicators for each of multiple performance indicator types. Determining the classifications for the one or more communication devices comprises: providing, as input to the machine learning model, feature scores based on the performance indicators included in the performance indicator report of the particular communication device; and determining the classification for the particular communication device based on output that the machine learning model generates in response to receiving the feature scores as input.

In some implementations, determining the classifications comprises, for each of the performance indicators, assigning a classification indicating whether the performance indicator is in a predetermined range, above the predetermined range, or below the predetermined range.

In some implementations, the network performance indicators comprise indicators for multiple network layers.

In some implementations, the performance indicators comprise values indicating one or more of an error count, an error type, an amount of delay, an amount of data received, an amount of data discarded, an amount of data retransmitted, an amount of bandwidth allocated, or an amount of a particular type of network message sent or received.

In some implementations, the machine learning model comprises a deep neural network.

In some implementations, the machine learning model comprises at least one of a neural network, a support vector machine, a classifier, a regression model, a clustering model, a decision tree, a random forest model, a genetic algorithm, a Bayesian model, or a Gaussian mixture model.

In some implementations, the machine learning model is configured to output a set of scores including a score for each of the classifications in the predetermined set of classifications, wherein the scores indicate relative likelihoods that the respective classifications are appropriate given the input provided to the machine learning model.

In some implementations, the method includes: generating visualization data for a visualization of the clusters, wherein the visualization comprises elements representing the types of anomalies and indicates levels of co-occurrence of types of anomalies; and providing the visualization data to a client device over a network. Determining the labels for the clusters comprises receiving data indicating labels applied to the clusters through user input to a user interface that displays the visualization of the clusters.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
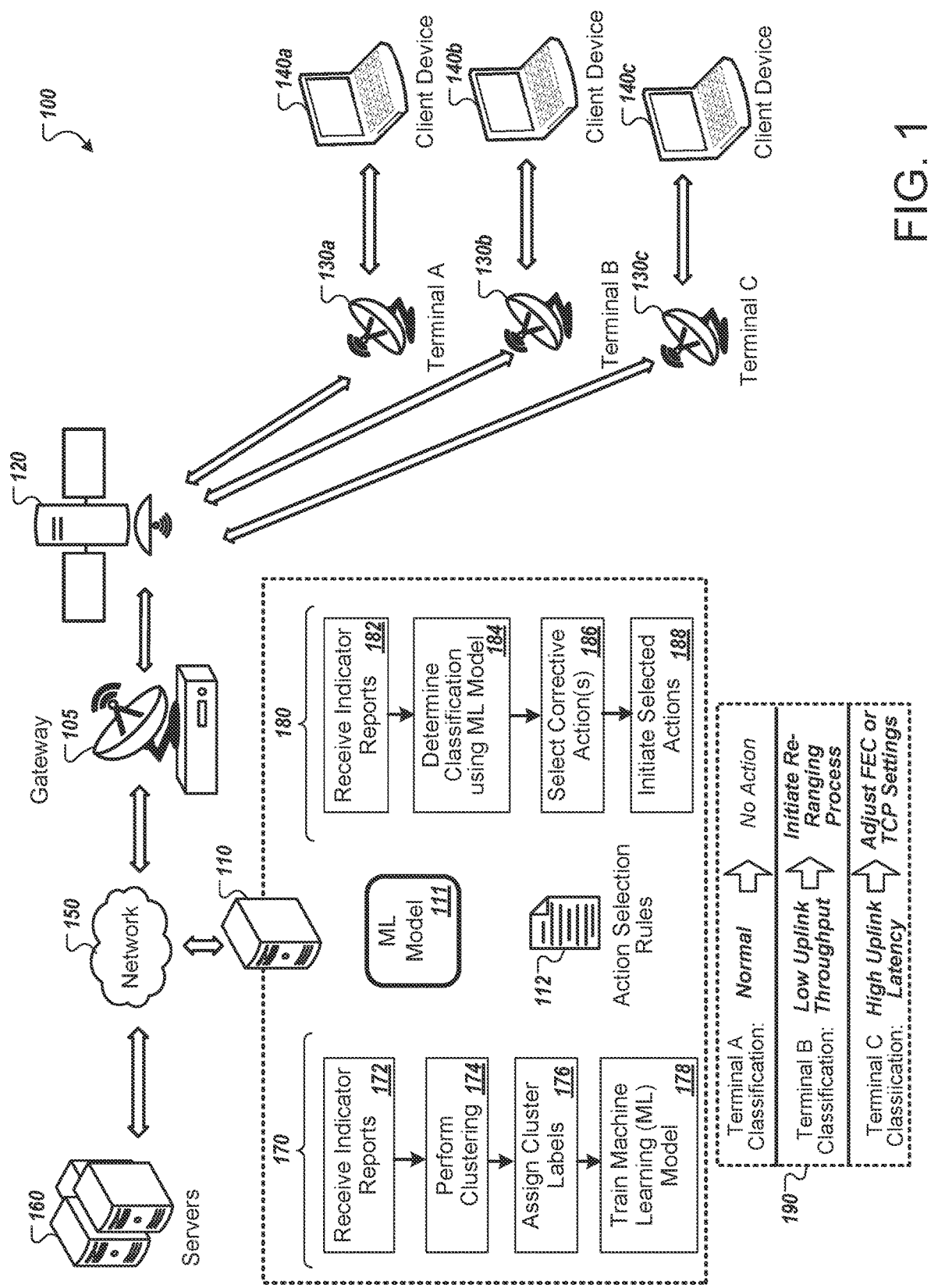
FIG. 1 is a diagram showing an example of a system for using machine learning to enhance performance in a communication system.

FIG. 1 is a diagram showing an example of a system 100 for using machine learning to detect and correct performance limitations in a communication system. The system 100 includes a satellite gateway 105 that communicates with one or more satellites 120 to provide network access to various satellite terminals 130a-130c. Each satellite terminal 130a-130c can be a VSAT that provides network access to one or more client devices 140a-140c (e.g., phones, laptop computers, desktop computers, Internet of Things (IoT) devices, appliances, etc.). The gateway 105 connects to a network 150, such as a wide area network, core network, or other public network such as the Internet. Various servers 160 and other devices can communicate with the client devices 140a-140c through the network connections that the system provides.

The system 100 includes a computer system 110 that can receive and process information about the terminals 130a-130c to detect performance limitations and other network problems that may arise, and also to determine actions that can improve performance in the different situations detected. The system 110 performs two processes that facilitate this monitoring: a first process 170 that collects and analyzes network data to generate a machine learning model 111, and a second process 180 that uses the generated model 111 to classify terminals 130a-130c and automatically select and initiate actions to correct or mitigate network problems.

Briefly, in the first process 170, the computer system 110 collects performance indicator reports from the 130a-130c (step 172), and uses clustering techniques to detect the types of anomalies that occur together in the performance indicator reports (step 174). The computer system 110 then receives labels for the clusters that indicate the network problem or situation each cluster represents (step 176), for example, based on input of an expert user provided a visualization of the clusters. The computer system 110 applies the cluster labels to the indicator reports, so that each indicator report is assigned the label of the cluster that best represents the network problem indicated by the indicators in the report. The computer system 110 then uses the labeled data as training data to train a machine learning model 111 that can predict the labels or classifications for terminals based on input of indicator data of the terminals.

In the second process 180, the computer system 110 monitors terminals using the machine learning model 111. The terminals 130a-130c periodically send indicator reports, which the gateway 105 or other system can forward to the computer system 110 (step 182). For example, an automated agent (e.g., at the gateway 105 or another system) can send the indicator report for a terminal in a request to the computer system 110 through an application programming interface (API). The computer system 110 inputs the indicator data for each terminal to the machine learning model 111 and receives output indicating the most likely classification for the terminal (step 184). Using the classifications, the computer system 110 or the automated agent selects actions that can address (e.g., improve performance for) the network problems indicated by the determined classifications (step 186). The computer system 110 or the automated agent then instructs the selected actions to be performed (step 188), for example, to change a configuration of a terminal 130a-130c, to initiate re-ranging of the terminal 130a-130c, to reboot the terminal 130a-130c, or perform another action. In this manner, performance problems experienced by terminals 130a-130c can be quickly and automatically detected and mitigated.

In further detail, the system 100 can be used to automatically identify and track poorly performing satellite terminals. The system 100 can also automatically take action to improve performance for terminals identified as low performing. The system 100 can also examine massive amounts of network performance data to provide network engineers and operators better information about their networks.

One of the techniques that the computer system 110 can employ is to cluster various types of anomalies indicated by performance indicator reports and then use labels for the clusters to create a labeled dataset for training a machine learning model 111. This machine learning model 111 is able to predict, given the raw indicator values of a terminal 130a-130c, which cluster best describes the situation that a terminal 130a-130c is experiencing, and thus which situation or problem is applicable to that terminal. This categorization or classification for a terminal 130a-130c can be done periodically or on an on-demand basis, and then an adjustment action is taken by an automated agent. This enables many commonly-occurring problems to be solved automatically without involving a network engineer. In cases where the automated agent does not have a action available to address a problem, the automated agent can alert the network engineer with the triage results and classification that has already been done, thus saving significant time for the network engineer. The technique can provide high accuracy through the combination of large amounts of data from multiple networks and the domain expertise of human experts in labeling of the clusters. This is a significant improvement over typical processes, in which a network engineer typically would need to review data on a terminal-by-terminal basis and identify problems manually, based on the technician's expertise. In contrast, the proposed invention provides an automated and scalable method, with the added advantage of distilling of learning from multiple networks.

The present technique can provide better results than other machine learning approaches through specific classifications of network problems. For example, rather than providing a binary classification whether performance for a terminal 130a-130c is good or poor, the machine learning model 111 can provide more targeted classifications, such as "heavy user with sub-optimal transport performance" or "large transmit queue with high uplink delay." In addition, the present system improves versatility through the ability to use a variety of different classifications representing different situations. Many prior systems simply relied on status codes reported by a terminal or on the traffic volume handled by a terminal to assess the status of the terminal. The system 100 can leverage previous expert assisted-examination of the causal relationships to provide actionable classification that allows the system to make targeted adjustments to address the specific performance limitation or situation that the terminal is in.

Previous work in the area of applying machine learning to VSAT networks has focused mostly on network-level triage rather than individual terminal-level triage. The reason is that while network-level health is easier to be determined by using macro or aggregate indicators, such as network traffic statistics across groups of terminals, terminal-level triage is much more nuanced and needs more detailed information to determine the specific type of problem present for a specific terminal. For example, terminal-level triage typically requires gathering and reviewing several different terminal-specific metrics and then comparing these metrics with the terminal's own historical data (which may or may not be available) and comparing the metrics with metrics in the terminal's peer group, which are typically other terminals in the same outroute. This process includes several steps and not all the needed information may be available. By contrast, the techniques for using a machine learning model as discussed below are more robust in dealing with missing data and can provide more consistent and more accurate results.

To generate accurate machine learning models 111, the training process often uses a large amount of labeled data. In prior systems, the type and quality of labeled data needed has not been available. When traditional network triage is performed, there is typically no way to correlate results of analysis or troubleshooting with the original data representing the situation of the terminal, even when problems are tracked via a ticketing system. In addition, the results are often inconsistent and non-standardized, in a manner that a consistent set of network problems or conditions cannot be determined. In addition, manually labeling individual data sets is often prohibitively slow and inconsistent for generating a set of labeled data that is large and diverse enough to train a high-accuracy model across the wide variety of conditions that can occur.

The system 100 supports a data pipeline to collect performance indicators (e.g., typically around 30-50 metrics) from many different terminals 130a-130c, potentially each terminal in a network. Individual terminals 130a-130c can be configured to periodically send indicator reports indicating network conditions and the current state of a terminal and/or a collection of information about a recent time period. For example, reports can be sent each hour (e.g., with indicators for communication activity and terminal state over the last hour), each day (e.g., with indicators for communication activity and terminal state over the previous day), or at another interval. In some cases, the gateway 105 or computer system 110 can request the indicator reports.

Indicator reports are provided to the computer system 110. As a result, the computer system 110 can collect data from several tens of thousands of terminals 130a-130c periodically, for several data collection or analysis intervals. The computer system 110 can use a particular subset of this collected data, such as the data for a particular period of time (e.g., a month's worth of indicator reports) to create a dataset for training a machine learning model.

The computer system 110 can use various techniques to analyze the indicators in the indicator reports. For example, the computer system 110 can use statistical methods to categorize each indicator value for each terminal 130a-130c with respect to the indicator values of a peer group of terminals 130a-130c. For example, the computer system 110 can evaluate whether each indicator value is normal, low, or high compared to the indicator values of the same indicator type for other terminals 130a-130c in the peer group. The peer group can be the set of terminals using the same outroute or channel, a set of terminals using the same service plan, or another grouping of terminals.

To categorize or classify the values for each indicator type, the computer system 110 can determine references for each indicator type. Each indicator type (e.g., transmit latency, transmit queue depth, downlink bytes received, etc.) can have a different set of reference levels or thresholds set as references. Characteristics of the distribution of values in the peer group can be used to set the references. For example, a simple approach can set the thresholds for the "normal" range to include 50% of the indicator values for a certain indicator type, with values less than the normal range being considered to be "low" and values above the normal range considered to be "high." Other approaches can use other levels for the boundaries of the normal range, such as to set the normal range to be the range from three standard deviations above or below the mean for the indicator type. In some implementations, more than three or fewer than three classes can be used for an indicator type. For example, values of a certain indicator type might be classified as "very low" at less than five standard deviations below the mean, "low" between five and three standard deviations below the mean, "normal" from three standard deviations below the mean to three standard deviations above the mean, "high" between three and five standard deviations above the mean, and "very high" at more than five standard deviations above the mean. The classifications can be represented as numbers or any other appropriate values to represent the classifications. The types of classifications and the techniques for setting the references can vary from one indicator type to another. In many cases, it is beneficial to set the reference values based on the statistical properties of the dataset, which allows the computer system 110 to automatically set and adjust threshold based on the properties of the data using a predetermined equation or criteria. Nevertheless, in some cases or for some criteria, the reference levels may be set manually, such as to better identify known anomalous conditions or to provide consistency across datasets.

In some implementations, the computer system 110 can filter the dataset to remove examples where all indicator values are normal. The normal examples can be labeled as normal, and can be used in training the machine learning model 111 as example of normal or desired operation. After filtering, the remaining examples have at least one indicator value that is not in the normal range, e.g., classified as either "low" or "high." The computer system 110 can create a derived field in this filtered dataset that includes the overall terminal status. The value in the overall terminal status derived field can include a list of all of the anomalies present across all of the indicators, e.g., a list of all "not-normal" indicators. This derived dataset is now ready for identifying causal relationships between indicators.

From the derived dataset, the computer system 110 evaluates combinations of anomaly types that occur together. Each non-normal classification for an indicator type can be considered a different type of anomaly. For example, a high uplink delay, a low uplink delay, a high amount of bytes received, and a low amount of bytes received can all be considered to be different types of anomalies. As another example, a "high" transmit delay is considered to be a separate anomaly from a "low" transmit delay, and so each is treated as a different anomalous condition that may occur. The computer system 110 can identify each pair of anomaly types (e.g., non-normal indicator value categories) that occur together, and the computer system 110 can also determine the frequency with which each pair occurs. As an example, the computer system 110 may determine that "high" transmit delay occurs together with "high" bytes received in 132 examples, that "high" transmit delay occurs together with "low" bytes received in 74 examples, that "low" bytes received occurs together with a "high" transmit queue depth in 111 examples, and so on.

The computer system 110 can then generate a visualization (see FIG. 4) of the different combinations of non-normal indicators and the levels of co-occurrence among them. For example, the visualization can be a network graph of nodes and edges, with the categorized indicators representing the graph's nodes and the edges representing the strength of relationship (e.g., frequency of co-occurrence) of the categorized indicators. This type of visualization reveals clusters in the data, such as which categorized indicators occur together most frequently. For example, the distance between the nodes can indicate the frequency of co-occurrence of the indicators that the nodes represent, so that nodes that occur together most frequently are closest to each other. Other indicators of the level of co-occurrence can include the width, color, shade, or other characteristics of the edges drawn between the nodes.

The computer system 110 can apply any of various techniques to group the types of anomalies represented by nodes into clusters. For example, the computer system 110 can have parameters that set cluster boundaries at a certain level, such as to keep in a cluster anomaly types that have occurred together at least 100 times with at least one other anomaly type in the cluster. Clusters can be separated where anomaly types have occurred together less than 100 times. As another example, the computer system 110 can have a parameter to group the nodes into a predetermined number of clusters, with the boundaries being set to achieve the best-fit grouping that provides the desired number of clusters.

Figure 4:
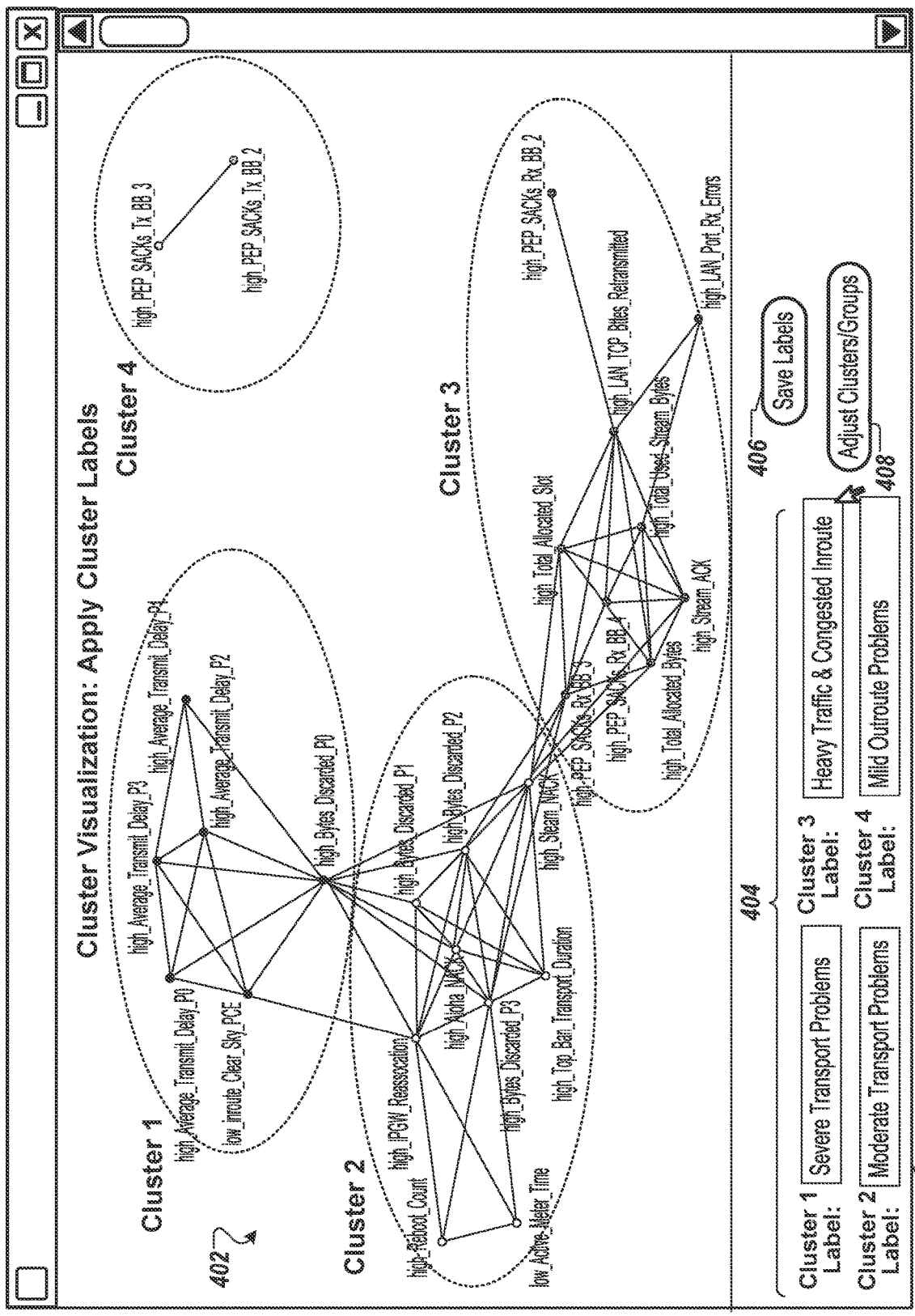
FIG. 4 is a diagram that shows an example of a user interface for visualizing and labeling clusters of performance indicator reports for communication devices.

The computer system 110 provides a user interface for expert users to assign names or labels to the clusters (see FIG. 4). Experts can assign names to the clusters, such as "heavy downlink usage," "heavy usage with some uplink issues," etc. Each cluster represents a problem type that can be assigned to individual terminals. The user interface can also include tools that enable the expert users to manually set or change cluster boundaries, to change values of the parameters used for clustering the elements, and so on.

Once clusters of anomalies have been defined and labeled, the computer system 110 evaluates the indicator reports for individual terminals 130*a*-130*c* to assign them labels based on how similar the anomalies in the indicator reports are to the anomalies in the different clusters. In general, an indicator report for a terminal can be assigned the label of a cluster when the report exhibits at least a minimum amount (e.g., more than 50%, or some other configurable threshold) of the types of anomalies that are included in the cluster. For example, a cluster for moderate transport problems may be defined to include four anomaly types (e.g., high reboot count, high bytes discarded, low active meter time, and high gateway re-association count). If a threshold of 50% is used, terminals that report at least two of the four anomaly types in the cluster can be considered to have the problem represented by the cluster. For example, a terminal that has high reboot count and high bytes discarded would be labeled to have a moderate transport problem, according to the label of the cluster for which the threshold is met. Terminals or indicator reports that report only one or none of the anomaly types in the cluster would not receive the label of the cluster.

In some cases, the comparison with the clusters may result in multiple clusters or network problems being associated with a terminal or indicator report. To address this, in some cases the computer system 110 selects a single best-fitting cluster. The computer system 110 can store and apply a set of rules to decide which cluster label best applies to a terminal. For example, the computer system 110 can use rules that designate that a cluster representing downlink transport problems should be selected over a cluster representing uplink transport problems if both apply to the same terminal or indicator report. As another example, the computer system 110 can store data indicating a ranking (e.g., as specified by the expert user) of different clusters or problems, that indicates the importance (e.g., indicating priority, severity, urgency, etc.) of different network problems, and so the computer system 110 selects the cluster and label having the highest importance. As another example, the computer system 110 may select the cluster for which the indicator report shows the greatest number or proportion of the anomalous indicators for the cluster. If a terminal's indicator report indicates 60% of the anomalies of cluster 1 are present, and that 80% of the anomalies of cluster 2 are present, the computer system 110 can select cluster 2 and its label as the best fit.

The computer system 110 can use the defined clusters and to assign labels to terminals. For example, the computer system 110 assigns labels to the terminals according to which cluster each terminal's reports match most closely. As a result, each terminal experiencing a network problem receives a label for each data collection or analysis interval. As discussed above, assignment of a label can be based on statistical measures, rules, or combination of both. If a data collection interval includes multiple indicator reports, the computer system 110 can apply rules to summarize or smooth the label to represent the status for the interval as a whole. For example, if a terminal has multiple indicator reports in an analysis interval, the label that was applied most frequently can be selected. Thus, if a terminal had four reports in an analysis interval, with two labeled "moderate transport problems," one labeled "severe transport problems," and another was normal, the terminal can be categorized as having "moderate transport problems" for the interval as a whole. As another example, rules can designate that the occurrence of a problem for even part of an interval results in the label being applied for the interval as a whole. As a result, if a terminal had a problem for only some of the indicator reports and was normal for others in the analysis interval, the problem label can be selected as the overall label for the entire analysis interval.

The categorization of which cluster and label best applies to a terminal is done periodically (e.g., hourly or daily for example). The results can be fed to an automated agent which can take an action based on the information. In some cases, the action could be to re-range the terminal so that it can recalibrate its power and timing for optimum uplink transmission. Other actions can include rebooting the terminal, changing network settings for the terminal, changing network access allocations for the terminal, changing the satellite or satellite beam used by the terminal, changing configuration settings of the terminal, changing modulation or error correction coding used for the terminal, and so on. A summary of the automated actions taken can then be provided to network engineers via email, text messages, in-application notifications, or other "push" mechanisms. The current and historical categorizations for terminals, and the actions taken based on those categorizations, can be stored by the computer system 110 can be provided in a dashboard or other management interface.

The computer system 110 also uses the data set indicating the assignment of labels to terminals and indicator reports to train the machine learning model 111. The machine learning model 111 is trained to learn the relationship between a terminal's indicator values and the cluster label assigned to the terminal or indicator report. For example, the training data can be examples that include (i) the set of values of an indicator report and/or the classifications for each indicator value, e.g., whether each indicator is high, normal, or low, and (ii) the corresponding cluster label that was applied to the indicator report.

Once trained to an acceptable degree of accuracy, the machine learning model 111 is deployed in a server such as the computer system 110, where inference processing can be accessed as a service through a REST API. Through the API, a client system can provide a set of performance indicators for a terminal, and in response the API provides a problem category for the terminal. The machine learning model 111 thus represents an encoding of the human expertise into a mathematical model that is available all the time for triage. The machine learning model 111 can be used to provide information to a human user, for example, to populate information in a dashboard that invokes the model 111 via the API. The machine learning model 111 can also be accessed by an automated agent, and the automated agent can then take an appropriate action to improve performance. Using the model 111, the computer system 110 is able to provide classification predictions for many terminals with minimal latency and low computational cost. As a result, the status of terminals can be checked frequently (e.g., every 10 minutes, every hour, etc.) as needed. In addition, because the model 111 incorporates information about many different problems and the ways those problems are manifest in the indicator reports, the model 111 can be applied in terminals in any network, without the need to first collect large amounts of data from that network.

Figure 2:
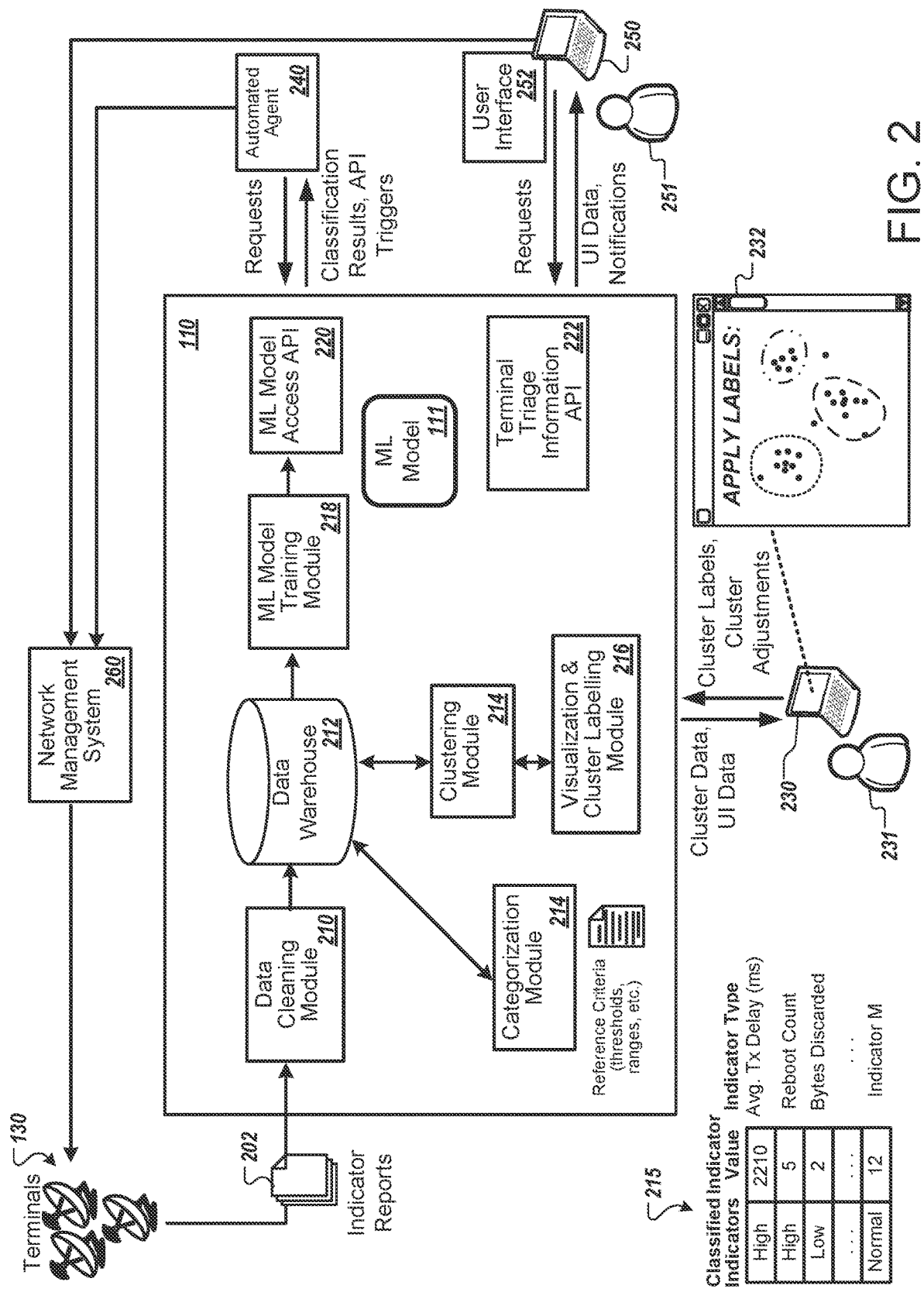
FIG. 2 is a diagram that shows an example of processing operations performed to train a machine learning model and monitor communication device performance.

FIG. 2 is a diagram that shows an example of processing operations performed to train a machine learning model 111 and monitor communication device performance. The example of FIG. 2 shows many of the aspects of the system 110 shown in FIG. 1 in greater detail.

As an overview, the example of FIG. 2 shows how the computer system 110 can perform data collection, clustering, data labeling, and machine learning training to provide a service for detecting network problems for terminals 130. The figure shows indicator reports 202 being received from terminals 130 in various networks. The reports 202 are processed and stored in a data warehouse 212, which may be implemented using cloud computing storage. The data is then processed to determine the relationships among anomalous indicators, e.g., how often different anomalies occur together. This process can include generating clusters of anomalous indicator conditions that occur together most frequently. The computer system 110 provides visualization data that facilitates labelling of the indicator clusters with the network problem or situation that corresponds to the indicator cluster.

The computer system 110 then determines which indicator reports 202 best fit the different clusters. For example, for each indicator report 202, using the cluster definitions, the computer system 110 determines which cluster of anomaly types is most similar to the set of anomalies present in the indicator report 202. The cluster labels are then applied to the indicator reports 202, so that the original dataset has indicator reports 202 marked with the most applicable network problem or situation. The computer system 110 then trains the machine learning model 111 using the labeled examples. Once the machine learning model 111 is trained, an automated agent can request classification of new data about terminals, and based on the classification from the model 111 the agent can select adjustment actions as appropriate. Results from the model 111 can also be provided to human users to monitor the status and health of terminals in a network.

In further detail, the example shows the terminals 130 providing indicator reports 202, which enter a data pipeline executed or managed by the computer system 110. The data pipeline reads data from a data aggregation point which could be in the core network or in a data center and then ingests it into a data warehouse 212, which is often implemented using cloud-computing storage. The data pipeline includes a data cleaning module 210 that cleans the data, for example, adjusting data types, removes mis-formatted data samples, etc. The data pipeline ingests new data on an ongoing basis as new data is received. In some implementations, the data pipeline runs on a cloud-computing-based serverless platform.

The indicators stored and evaluated in the system can be selected by the designer of the system. The types of indicators used can include metrics corresponding to any or all layers of the network communication stack, e.g., the satellite transport layer, the IP transport and routing layer, the application layer, etc. Typically, this results in several dozen metrics across different layers of network functionality being used as indicators in the system. For example, from the satellite transport layer, metrics such as inroute clear sky power conversion efficiency (PCE) and transmit delays on each of different priority queues are types of indicators used. In addition, from the IP transport and routing layer, metrics such as counts of TCP acceleration errors are used as indicators, and from the application layer, web acceleration traffic measures and error counts are used as indicators.

For each example in the data warehouse 212 (e.g., for each indicator report 202 received), the record includes a high-dimensional vector of indicators corresponding to particular terminal in a particular time interval. The time intervals can be 5-minute intervals, one-hour intervals, etc. The examples are then grouped together to create a peer group, for example, all terminals that share the same outroute or service plan during a given time interval.

Once examples are grouped into peer groups, the computer system 110 categorizes the indicator values in each of the examples. A categorization module 214 can perform categorization of indicator values as a periodic task. The categorization can include determining, for each indicator value of each indicator report 202, whether the indicator value is normal, low, or high given the distribution of values for the indicator type in indicator reports 202 for the peer group. An example of this is shown as element 215, where indicator values have each been categorized as high, normal, or low. The categorization can be performed by calculating the z-score for each metric in each sample. A z-score is calculated as (sample_value−mean_value)/standard_deviation. The z-score can be considered to be "low" if it is less than a configurable threshold (e.g., −3), and a z-score can be considered to be "high" if it is larger than a configurable threshold (e.g., +3), and all other z-score values are considered to be "normal". A low value or a high value represents an anomaly or outlier value in the peer group, while a normal value represents a value in an acceptable range of variance based on the dataset for the peer group.

Once all indicator values have been categorized as normal, low, or high, the overall categorization of the terminal in a given time interval is defined as a tuple containing all the non-normal categorizations (e.g., all of the different types of anomalies identified) for the terminal if there is even one metric that is non-normal. On the other hand, if there is no non-normal metric, then the overall categorization for the terminal is "normal."

The following table, Table 1, illustrates the derived dataset thus created after running the algorithm described above. This process brings together categorized indicators. For example, in the table below, the terminal B20CHP0000178 is exhibiting "high Aloha NACK" as well as "high Average Transmit Delay on Priority Queue 0." This co-occurrence reveals a causal relationship, because a high count of Aloha negative acknowledgements (NACKs) indicates that the gateway is not allocating requested bandwidth to this terminal, and this is causing traffic to get queued up in the transmit queues, leading to high average transmit delays. That ultimately leads to problems in the higher layers of network operation, such as the VSAT frequently re-associating with the gateway. The identification of co-occurring anomalies in an automatic and predictable way provides high value and high accuracy data for triaging terminal status. In addition, the technique is robust across a wide variety of situations because it is based on not only a single terminal's data, but also on what other terminals in the peer group are experiencing.

TABLE 1

| Terminal | Timestamp | Overall Terminal Status (List of Anomalies Present) |
|---|---|---|
| XXX000032567 | 2022 Apr. 01 01:00:00 UTC | normal |
| XXX000031555 | 2022 Apr. 01 01:00:00 UTC | high Average_Transmit_Delay_P3 |
| XXX000045954 | 2022 Apr. 01 02:00:00 UTC | high Average_Transmit_Delay_P1, high Average_Transmit_Delay_P3 |
| XXX000000178 | 2022 Apr. 01 04:00:00 UTC | high Aloha_NACK, high Average_Transmit_Delay_P0, high IPGW_Reassociation_Count, high Top_Bad_Transport_Duration |
| XXX000027019 | 2022 Apr. 01 05:00:00 UTC | normal |
| XXX000010969 | 2022 Apr. 01 07:00:00 UTC | normal |
| XXX000031555 | 2022 Apr. 01 10:00:00 UTC | high Average_Transmit_Delay_P3 |

The next step after identifying the overall terminal status is to explore the relationships between the indicators. Specifically, this means identifying which anomaly types (e.g., which categorized indicators) are strongly correlated due to co-occurrence and which group of anomaly types usually occur together as a cluster. For example, the high Aloha NACKs and the high transmit delays often occur together. This happens because a high Aloha NACK count is usually associated with high transport delays in priority queues, and often results in re-association with the IP packet processing platform.

The clusters of correlated anomaly types can be identified by using advanced visualization techniques. The computer system 110 can use a visualization and cluster labelling module 216 to create a network graph of anomaly types, with each anomaly type represented as a node, and anomaly types that occur together linked by an edge (see FIG. 4). The width of an edge between two nodes is proportional to the degree of correlation between the anomaly types representing the two nodes. This type of network graph visualization emphasizes clusters of correlated anomaly types. The data for the visualization can be provided over a network to client devices 230 of human experts 231. The client devices 230 present the visualization 232, and the experts 231 then enter labels for the clusters of anomaly types. The labels are provided to the computer system 110 and are stored in association with the clusters to which they are assigned. The experts 231 can also specify the adjustment actions that should be taken, or rules that should be used to select adjustment actions, which can also be stored for each cluster. An example of clusters, anomalies included in clusters, labels, a problem description, and potential adjustment actions are shown in Table 2 below.

TABLE 2

| Problem Cluster | Cluster Definition (List of Related Anomalies) | Cluster Label | Problem Description | Potential Adjustment Action |
|---|---|---|---|---|
| 1 | high Average_Transmit_Delay_P0 high Average_Transmit_Delay_P1 high Average_Transmit_Delay_P2 | severe-transport-problems-with-degraded-end-user-performance | End user traffic is being dropped, immediate action is needed. | Force range to adjust uplink power and timing |
| 2 | high Reboot_Count high Bytes_Discarded_P0 high Bytes_Discarded_P1 . . . | sub-optimal-transport-performance | User performance is somewhat impacted, especially video and other real time traffic. | Alert a network engineer if condition persists. |
| 3 | high Total_Allocated_Slots high Stream_ACK high Total_Allocated_Bytes . . . | heavy-traffic-with-congested-inroute | End user is pushing and receiving a lot of traffic, there is some congestion but this is expected/acceptable. | Alert customer support, user is candidate for an up-sell (higher value service plan). |
| 4 | high PEP_SACKs_Tx_BB_2 high PEP_SACKS_Tx_BB_3 | mild-outroute-problems | Life in the big city. Outroute is congested, user is not impacted adversely other than in general being a part of a congested network. | Weekly alert to network architect about network getting congested. |

Once the clusters are defined and the cluster labels determined, each example (e.g., each indicator report 202) in the original dataset can be assigned a cluster label. For example, an applicable cluster label can be determined for each terminal for data collection interval. The cluster label can be defined based on the terminal's overall terminal status summary in the interval, which lists the anomaly types identified for the terminal, if any. The computer system 110 determines the intersection between (1) the set of the terminal's anomaly types (e.g., not-normal indicators) in any given time interval with (2) the set of anomaly types that define the respective clusters. This can be done by separately comparing the contents of the field for a terminal in the "Overall Terminal Status" column of Table 1 with each of the respective fields in the "Cluster Definition" column of Table 2. The cluster with which a terminal (in a given time interval) has the highest degree of intersection (e.g., highest number or proportion of anomaly type matches) is the cluster to which the terminal is assigned. In case of a tie, the computer system 110 uses a set of rules to determine the selection, so that only a single label is selected. As an example, cluster labels representing transport problems can be chosen over non-transport problem clusters. If the terminal's overall category was "normal" then it is simply categorized as "normal" and no cluster membership is tested.

Once the cluster label assignment is done for individual indicator reports 202, the computer system 110 can determine the overall cluster assignment of each terminal 130 across multiple reporting periods, by determining the cluster label that is applicable the terminal belongs to most often. Most of the time, it is possible that a terminal 130 does not experience the problems of any of the different clusters, and so can be classified as having normal operation. What is of interest are the terminals 130 that exhibit unusual behavior and the cluster labels that are most often applicable to those terminals 130. The classification for each terminal 130 can be done for a period of time, such as a 24-hour time window, and can be done for any or all terminals in the network. The computer system 110 can provide the results of this analysis are to both a network engineer 251 and an automated agent 240. The network engineer 251 can be provided these results in the form of email alerts and dashboards or reports, which can be accessed through a client device 250. The automated agent 240 is provided these results via an API trigger. In response, the automated agent 240 can take a predetermined adjustment action, such as based on action selection rules 112 discussed with respect to FIG. 1. The analysis cycle described above can be repeated on a periodic basis, for example, daily.

The computer system 110 then uses the labeled data (e.g., the indicator reports 202 and cluster labels assigned to them), to train a machine learning model 111. After training, given input of the indicator values for a terminal 130, the machine learning model 111 can predict the label that would apply to the terminal 130. The process described herein solves a fundamental problem, e.g., the lack of labeled training data needed for supervised learning to achieve high accuracy and robustness across a wide variety of situations in modern complex networks. Machine learning models (e.g., ensemble models, deep learning models, gradient-boosted models, etc.) can thus be created for terminal-level triage in telecommunication networks. The triage and classification performed to obtain the labeled data as described above is not feasible to be done by a human user due to the scale of the problem (e.g., thousands of terminals and high-dimensional data). In addition, human labeling of the data would typically introduce inconsistency and variability that would limit the ability of models to converge to a high-confidence classification result. The present techniques solves the problem of getting labeled data by first figuring out causal relationships between indicators and anomalies in those indicators, and automatically defining the clusters representing different network problems. The human experts need only to provide the names for the already-identified clusters and to set the rules for selecting adjustment actions.

The computer system 110 trains the machine learning model 111 to solve a multi-class classification problem. The classes among which the model 111 can distinguish can include the classes corresponding to the different clusters identified. The training process can use many examples (e.g., many thousands or even millions of examples) of how combinations of indicator values map to cluster labels. The training can incrementally or iteratively adjust the model 111 to model the relationships indicated by the examples. Various machine learning models can be employed, such as deep learning methods (e.g., deep feed-forward neural networks, convolutional neural networks etc. with different architectures, activation functions and hyperparameter options), gradient-boosted methods, tree-based methods, ensemble models, etc. An example of training of the machine learning model is provided in further detail in FIG. 3.t After the computer system 110 trains the machine learning model 111, the computer system 110 makes the model 111 available for inference processing through an application programming interface (API). For example, the output of the machine learning model 111 generated based on incoming streams of current indicator reports 202 is provided to an automated agent 240, which can take adjustment actions based on the classification (e.g., cluster label assignment) of a terminal. In some implementations, the computer system 110 tracks the classification of individual terminals over time, across multiple indicator reports 202. For example, rather than provide a classification based on a single indicator report representing a 5-minute period, the computer system 110 can track the status over twelve 5-minute periods to determine the most common classification across the twelve indicator reports 202. The computer system 110 can then notify the automated agent 240 when a problem is persistent or sufficiently verified across an appropriate span of time to be indicated with high confidence. Of course, in some cases, severe problems detected may be signaled immediately or with shorter waiting periods for analysis.

One advantage of this approach is that because the model 111 is trained on data from several networks, the model 111 generalizes extremely well (e.g., it is not overfitted to one particular network). Once the model 111 is available it can be applied directly to newer networks as they set up, even before data from these networks is available to further augment training data and contribute to retraining of the model 111. The machine learning model 111 can be hosted to provide access through a representational state transfer (REST) API, which can be invoked periodically for all terminals 130 in the network by an automated agent 240 which then takes adjustment action on a terminal-by-terminal basis. The model 111 is also available to customer care portals, where a customer service agent can request predictions for any given terminal 130 based on latest data available for the terminal 130 and thus get actionable intelligence about the terminal 130 in near real time.

Figure 3:
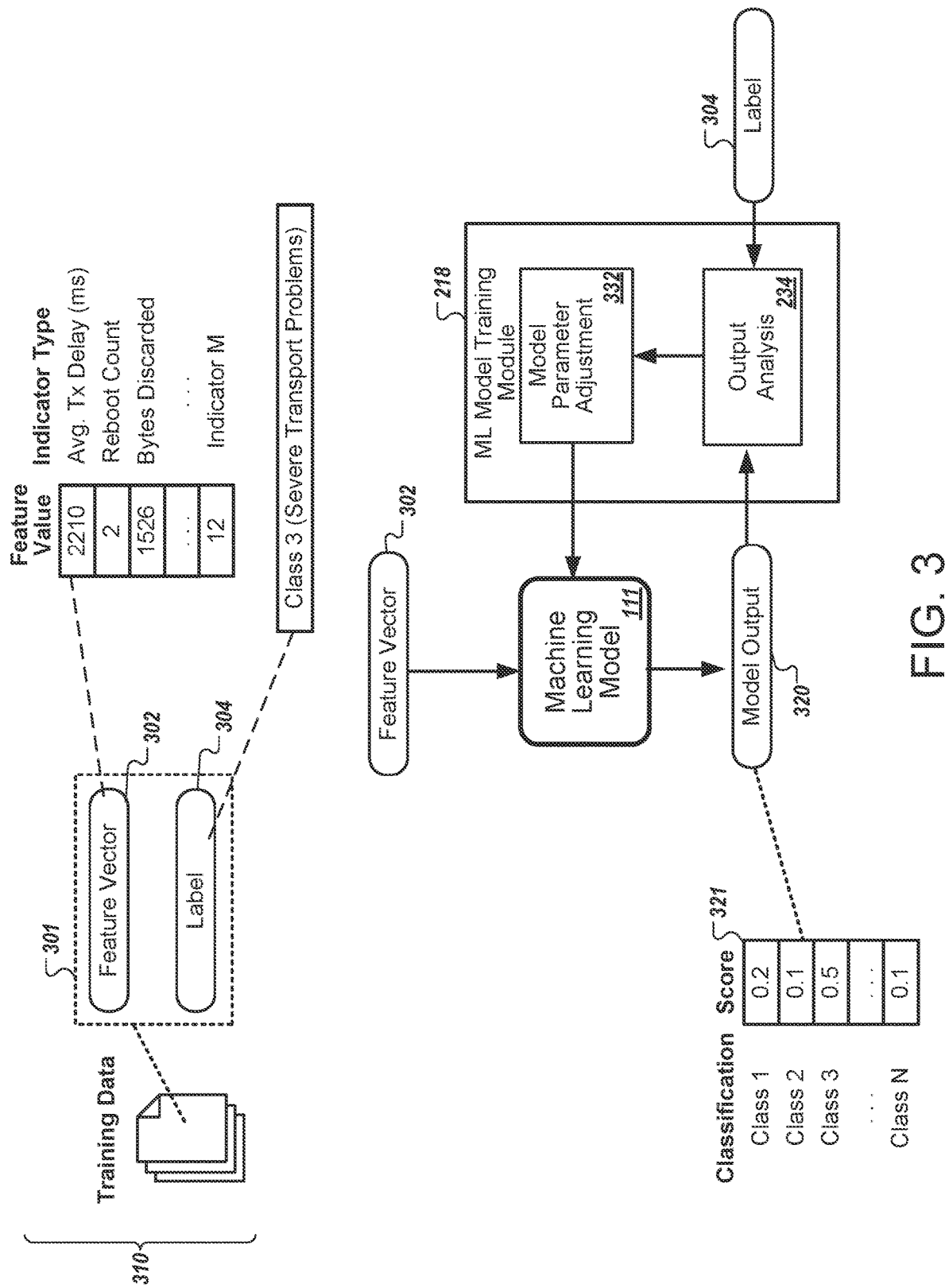
FIG. 3 is a diagram that shows an example of a process for training a machine learning model.

FIG. 3 shows an example of processes used to train the machine learning model 111. The training process can be performed by the computer system 110, for example, a centralized server, a cloud computing-based server, or computing functions distributed across multiple servers.

To train the machine learning model 111, the computer system 110 uses a set of training data 310. The training data 310 includes many examples 301, where each example 301 represents a feature vector 302 and a label 304 based on a cluster that is most similar to the anomalies in the feature vector 302. Each example 301 is based on a different indicator report 202. For example, an example 301 can include information from a single terminal 140a-140c at a particular time, e.g., based on a single indicator report 202. Examples 301 are included from many different terminals 140a-140c, and can provide examples of many different situations or conditions respectively experienced by the terminals 140a-140c. In addition, the training data 310 can include multiple examples 301 for each terminal 140a-140c, to show the different conditions that the terminals 140a-140c experience over time.

Each training example 301 includes a feature vector 302 that indicates various performance indicators. As illustrated, the feature values in the feature vector 302 can be values for indicators, in a standardized format. Unlike the clustering technique that used classifications or categories (see the classified indicators 215 of FIG. 2), the values in the feature vector need not be categorized with respect to a peer group. Through the application of the labels to the indicator reports 202, the training data set 310 already includes the information about which values and combinations of values represent different classifications. As a result, the model 111 trained using the examples 310 can be configured to receive input of the raw indicator values rather than relative measures with respect to a peer group. Nevertheless, a wide variety of feature value types can be included, and in some implementations functions can be applied to indicator values to standardize, normalize, quantize, categorize, or otherwise adjust indicator values to generate feature values used as input to the model 111.

Each example 301 in the training data 310 can have a corresponding label 304. The label can indicate a classification, selected from among various predetermined classes or categories, that is believed to best describe the state of the terminal when the conditions indicated by the feature vector 302 were present. As discussed above, the various indicator reports 202 can be clustered, where each cluster includes reports 202 that describe a particular type of network problem or performance abnormality. The clusters can then be labeled, such as by a human expert. The labels applied to the clusters are applied to the reports 202 in the cluster, so each report 202 is assigned the label of the cluster to which it belongs. This technique can provide much more accurate classification than analysis of reports 202 individually. In many cases, with the large numbers of metrics and high levels of variation in values for those metrics, the type of problem may not be readily apparent from the indicators for an individual terminal. However, by assessing the patterns and similarities among clusters of reports 202, the overall situation may be much more apparent.

The cluster labels can be used as classifications that the machine learning model 111 is trained to predict or distinguish among. For example, N different classes can be determined, with each representing a different operating state or condition of a terminal. For example, class 1 may represent normal operation, class 2 may represent high uplink latency, class 3 may represent low downlink throughput, and so on.

The computer system 110 includes a model training module 218 that is configured to perform many training iterations based on different training examples 301. Through many iterations of training, the machine learning model 111 gradually and incrementally learns to make more and more accurate predictions about the classification or state of a terminal based on the feature vector 302 for the terminal. The training process illustrated in FIG. 3 can be used in the initial generation of the machine learning model 111. In addition, or as an alternative, the training process shown in FIG. 3 can be used to update or enhance an existing machine learning model 111, for example, to create an updated version of the machine learning model 111 after it has been deployed and is in use. Through ongoing collection of training data 310 and continuing training iterations based on those new examples, the computer system 110 can improve its accuracy over time and can learn to respond to new situations that may appear over time. In some cases, through further clustering and labeling of additional data, the set of classifications that the model 111 can predict or distinguish among can be changed, such as to add new classifications representing new clusters identified. Updating the model 111 can thus include updating the predetermined set of classes that the model 111 may use for predictions, using examples of the updated set of classes.

Each training iteration can be based on one of the training examples 301. The input to the machine learning model 111 can be the feature vector 302. In some implementations, the machine learning model 111 makes classification decisions based only on the feature vector 302. In other implementations, additional information can be provided as input to the machine learning model 111. For example, information about terminal or situation represented in the feature vector 302 may also be provided as input, such as the device type or model of a terminal, the service plan used, the network involved, and so on.

After receiving the input vector having the feature vector 302 and potentially other feature values, the machine learning model 111 generates an output 320. This output 320 can be an output vector 321 having values indicating relative likelihoods that the various predetermined classes are applicable given the feature vector 302 provided as input. The machine learning model 111 can be structured so that the output vector 321 includes a score for each of the predetermined classes. For example, the machine learning model 111 can be configured to generate an output vector 321 that provides a probability distribution over the set of predetermined classes. For example, the model 111 can be trained so that the scores in output vector 321 sum to 1 to represent a total of 100% probability across the set of classes. In the example, scores are assigned to the classes and the highest score indicates that the corresponding class (in this case, class 3) is predicted to be most likely to represent the state of the terminal or the problem it is encountering, if any. This can be achieved, for example, using a neural network as the machine learning model 111 and using a softmax layer at the final processing step of the neural network, so that the output is a probability distribution over the predetermined set of classes.

The model training module 218 then uses the model output 320 for the current training example 301 and the label 304 for the current training example 301 to determine how to adjust the parameters of the model 111. For example, an output analysis module 334 can compare the highest-scoring classification indicated by the model output 320 with the classification indicated by the label 304. If the classification predicted by the model 111 does not match the label 304, the output analysis module 334 can identify that, for the features of the input feature vector 302, the model 111 should be adjusted to increase the likelihood of the classification indicated by the label 304 and/or decrease the likelihood of other classifications that do not match the label 304. The output analysis module 334 may calculate an error measure or a value of an objective function to quantify the error represented by the difference between the model output 320 and the label 304. The results of the analysis are provided to a model parameter adjustment module 332 that alters the values of parameters in the machine learning model 111. For example, in a neural network, the adjustment module 332 can adjust the values of weights and biases for nodes (e.g., neurons) in the neural network.

The analysis module 334 and the adjustment module 332 can operate together to train the model 111 using any appropriate algorithm such as backpropagation of error or stochastic gradient descent. Through many different training iterations, based on various different examples 301 in the training data 310, the model 111 learns to accurately predict the classifications for terminals based on input of performance indicators (e.g., measures of network conditions indicated by an input feature vector) for the terminals.

FIG. 4 is a diagram that shows an example of a user interface 400 for visualizing and labeling clusters of performance indicator reports for communication devices. The user interface 400 shows a visualization 402 on which characteristics of different performance indicator reports are illustrated. For example, the visualization 402 shows a network graph where each node represents a different anomalous performance indicator. The distance and/or connection width between each pair of nodes indicates the frequency of co-occurrence of anomalous indicators represented by the connected nodes. Each of the dots represents a different anomalous performance indicator. For example, there are elements that respectively represent high average transmit delay, high reboot count, high numbers of bytes discarded, and other anomalous indicator values. The various elements are positioned relative to each other in the visualization 402 based on the level of co-occurrence of the anomalies with each other. For example, the high bytes discarded element and the high ALOHA NACK elements may be placed near each other because the indicator reports 202 show that there is a significant level of co-occurrence of these conditions. Other techniques can be used to assess co-occurrence across combinations of more than two indicators. In other words, overall similarity (e.g., across all indicators) can be considered for reports 202 that have the "high ALOHA NACK" condition and reports 202 that have the "high bytes discarded" condition.

The visualization 402 also shows links or lines between the elements. These are darker and thicker, for example, to show stronger relationships, especially greater numbers of examples of co-occurrence of the anomalous conditions represented by the elements connected.

While there are over a dozen elements shown in the visualization 402, many of the individual elements represent features of a larger problem or cause of a performance limitation. The computer system 110 can identify groups of elements that represent a cluster for a certain type of problem or performance limitation. In the illustrated example, there are four groups or clusters, each representing a different type of communication problem or situation. In some implementations, the user is able to form the groupings manually or edit the groupings to ultimately set the final clusters that will be used in training the machine learning model 111.

Below the visualization 402, for example, the user interface 400 includes an area with text entry fields 404. The text entry fields 404 are controls that allow the user to specify the type of problem or situation that each group represents. For example, for group 1, the user has specified the label should be "severe transport problems." For group 2, the user has specified that the problem should be labeled as "moderate transport problems." For group 3, the user has labeled the problem "heavy traffic & congested in route." For group four, the user has labeled the problem as "mild outroute problems." In some implementations, the user interface 400 may provide a list of predetermined types of performance problems or classifications (e.g., standardized options) that the user can choose from (e.g., to select a previously-generated label). As another example, the user interface 400 can provide standardized terms that can be used to construct a label.

The user interface 400 also includes a save control 406 that the user can select to save the labels entered with the controls 404. The user interface 400 also includes additional and adjustment controls 408 that the user may select to redefine the groups or clusters that are used.

After the user enters labels and saves the applied labels, the computer system 110 can apply the labels to each of the indicator reports 202 and/or feature vectors determine based on those indicator reports 202. In this way, by labeling a relatively small number of groups with a problem type or cause of performance limitation, the system 110 can propagate that label to all indicator reports clustered in the same group. This provides accuracy and consistency for the training data set 310, and also help specify the sets of classifications that the machine learning model 111 will need to predict. In addition, the process provides understandable, human-readable descriptions of the classifications that can be used to explain or characterize the state of terminals that are monitored in the future.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on one or more non-transitory computer-readable media for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD- ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:

retrieving, by the one or more computers, data indicating labels for clusters of network performance anomalies, wherein the clusters respectively correspond to different network conditions experienced by satellite terminals of a satellite communication system, wherein the clusters each include multiple network performance anomalies grouped according to frequency of co-occurrence such that the clusters respectively represent different groups of network performance anomalies that are indicated by a data set to co-occur for individual satellite terminals of the satellite communication system, and wherein each label for a cluster indicates a network condition classification for a network condition associated with the network performance anomalies in the cluster;

generating, by the one or more computers, a set of training data to train a machine learning model, the set of training data being generated by assigning the labels for the clusters to sets of performance indicators used to generate the clusters, the labels being assigned based on levels of commonality among types of network performance anomalies indicated by respective sets of performance indicators and the types of network performance anomalies included in the respective clusters;

training, by the one or more computers, a machine learning model to predict network condition classifications for satellite terminals based on input of performance indicators for the satellite terminals, wherein the machine learning model is trained to evaluate satellite terminals with respect to a predetermined set of network condition classifications including the network condition classifications for the clusters, and wherein the machine learning model is trained using training data examples from the set of training data in which each training example includes a set of performance indicators and the label assigned for the set of performance indicators; and for each of one or more satellite terminals, determining, by the one or more computers, a network condition classification for the satellite terminal based on output that the trained machine learning model generates based on input of performance indicators for the satellite terminal.

2. The method of claim 1, further comprising managing, by the one or more computers, the one or more satellite terminals to automatically and selectively change operation or configuration of the one or more satellite terminals based on the respective network condition classifications determined based on the output of the trained machine learning model.

3. The method of claim 2, further comprising storing rules that indicate different operation or configuration changes corresponding to different network condition classifications in the predetermined set of network condition classifications;

wherein managing the one or more satellite terminals comprises, for a particular satellite terminal of the one or more satellite terminals:
  using, by the one or more computers, an output of the trained machine learning model to determine a network condition classification for the particular satellite terminal;
  selecting, by the one or more computers, a change to operation or configuration of the particular satellite terminal that the stored rules indicate for the determined network condition classification for the particular satellite terminal; and
  sending, by the one or more computers, an instruction to initiate the selected change for the particular satellite terminal.

4. The method of claim 1, further comprising:
  periodically receiving performance indicator reports from each satellite terminal in a set of satellite terminals;
  using the trained machine learning model to determine network condition classifications for the satellite terminals based on the received performance indicator reports, wherein the determined network condition classifications for each of multiple satellite terminals in the set of satellite terminals indicate network performance limitations; and
  for each of the multiple satellite terminals, selecting an adjustment action based on the network condition classification for the satellite terminal and automatically causing the selected adjustment action to be performed.

5. The method of claim 1, wherein training the machine learning model comprises using the label of each training example as a target output of the machine learning model for the training example.

6. The method of claim 1, wherein assigning the labels for the clusters to the sets of performance indicators comprises:
  for each of multiple different sets of performance indicators:
    determining the types of anomalies indicated by the set of performance indicators;
    comparing the determined types of network performance anomalies indicated by the set of performance indicators with the types of network performance anomalies included in the respective clusters;
    based on the comparisons, identifying, from among the clusters, the cluster for which the set of performance indicators has the largest number or largest proportion of types of anomalies in common; and
    assigning the label for the identified cluster to the set of performance indicators.

7. The method of claim 1, wherein determining the network condition classifications for the one or more satellite terminals comprises:
  providing, as input to the machine learning model, feature scores based on performance indicators included in a performance indicator report of a particular satellite terminal; and
  determining the network condition classification for the particular satellite terminal based on output that the machine learning model generates in response to receiving the feature scores as input.

8. The method of claim 1, wherein the machine learning model comprises a deep neural network.

9. The method of claim 1, wherein the machine learning model comprises at least one of a neural network, a support vector machine, a classifier, a regression model, a clustering model, a decision tree, a random forest model, a genetic algorithm, a Bayesian model, or a Gaussian mixture model.

10. The method of claim 1, wherein the machine learning model is configured to output a set of scores including a score for each of the network condition classifications in the predetermined set of network condition classifications, wherein the scores indicate relative likelihoods that the respective network condition classifications are appropriate given the input provided to the machine learning model.

11. A system comprising:
  one or more computers; and
  one or more computer-readable media storing instructions that are operable, when executed by the one or more computers, to cause the system to perform operations comprising:
    retrieving, by the one or more computers, data indicating labels for clusters of network performance anomalies, wherein the clusters respectively correspond to different network conditions experienced by satellite terminals of a satellite communication system, wherein the clusters each include multiple network performance anomalies grouped according to frequency of co-occurrence such that the clusters respectively represent different groups of network performance anomalies that are indicated by a data set to co-occur for individual satellite terminals of the satellite communication system, and wherein each label for a cluster indicates a network condition classification for a network condition associated with the network performance anomalies in the cluster;
    generating, by the one or more computers, a set of training data to train a machine learning model, the set of training data being generated by assigning the labels for the clusters to sets of performance indicators used to generate the clusters, the labels being assigned based on levels of commonality among types of network performance anomalies indicated by respective sets of performance indicators and the types of network performance anomalies included in the respective clusters;
    training, by the one or more computers, a machine learning model to predict network condition classifications for satellite terminals based on input of performance indicators for the satellite terminals, wherein the machine learning model is trained to evaluate satellite terminals with respect to a predetermined set of network condition classifications including the network condition classifications for the clusters, and wherein the machine learning model is trained using training data examples from the set of training data in which each training example includes a set of performance indicators and the label assigned for the set of performance indicators; and
    for each of one or more satellite terminals, determining, by the one or more computers, a network condition classification for the satellite terminal based on output that the trained machine learning model generates based on input of performance indicators for the satellite terminal.

12. The system of claim 11, wherein the operations further comprise managing, by the one or more computers, the one or more satellite terminals to automatically and selectively change operation or configuration of the one or more satellite terminals based on the respective network condition classifications determined based on the output of the trained machine learning model.

13. The system of claim 12, further comprising storing rules that indicate different operation or configuration changes corresponding to different network condition classifications in the predetermined set of network condition classifications;
wherein managing the one or more satellite terminals comprises, for a particular satellite terminal of the one or more satellite terminals:
using, by the one or more computers, an output of the trained machine learning model to determine a network condition classification for the particular satellite terminal;
selecting, by the one or more computers, a change to operation or configuration of the particular satellite terminal that the stored rules indicate for the determined network condition classification for the particular satellite terminal; and
sending, by the one or more computers, an instruction to initiate the selected change for the particular satellite terminal.

14. The system of claim 11, wherein the operations further comprise:
periodically receiving performance indicator reports from each satellite terminal in a set of satellite terminals;
using the trained machine learning model to determine network condition classifications for the satellite terminals based on the received performance indicator reports, wherein the determined network condition classifications for each of multiple satellite terminals in the set of satellite terminals indicate network performance limitations; and
for each of the multiple satellite terminals, selecting an adjustment action based on the network condition classification for the satellite terminal and automatically causing the selected adjustment action to be performed.

15. The system of claim 11, wherein training the machine learning model comprises using the label of each training example as a target output of the machine learning model for the training example.

16. The system of claim 11, wherein assigning the labels for the clusters to the sets of performance indicators comprises:
for each of multiple different sets of performance indicators:
determining the types of network performance anomalies indicated by the set of performance indicators;
comparing the determined types of anomalies indicated by the set of performance indicators with the types of network performance anomalies included in the respective clusters;
based on the comparisons, identifying, from among the clusters, the cluster for which the set of performance indicators has the largest number or largest proportion of types of anomalies in common; and
assigning the label for the identified cluster to the set of performance indicators.

17. The system of claim 11, wherein determining the network condition classifications for the one or more satellite terminals comprises:
providing, as input to the machine learning model, feature scores based on performance indicators included in a performance indicator report of a particular satellite terminal; and
determining the network condition classification for the particular satellite terminal based on output that the machine learning model generates in response to receiving the feature scores as input.

18. One or more non-transitory computer-readable media storing instructions that are operable, when executed by one or more computers, to cause the one or more computers to perform operations comprising:
retrieving, by the one or more computers, data indicating labels for clusters of network performance anomalies, wherein the clusters respectively correspond to different network conditions experienced by satellite terminals of a satellite communication system, wherein the clusters each include multiple network performance anomalies grouped according to frequency of co-occurrence such that the clusters respectively represent different groups of network performance anomalies that are indicated by a data set to co-occur for individual satellite terminals of the satellite communication system, and wherein each label for a cluster indicates a network condition classification for a network condition associated with the network performance anomalies in the cluster;
generating, by the one or more computers, a set of training data to train a machine learning model, the set of training data being generated by assigning the labels for the clusters to sets of performance indicators used to generate the clusters, the labels being assigned based on levels of commonality among types of network performance anomalies indicated by respective sets of performance indicators and the types of network performance anomalies included in the respective clusters;
training, by the one or more computers, a machine learning model to predict network condition classifications for satellite terminals based on input of performance indicators for the satellite terminals, wherein the machine learning model is trained to evaluate satellite terminals with respect to a predetermined set of network condition classifications including the network condition classifications for the clusters, and wherein the machine learning model is trained using training data examples from the set of training data in which each training example includes a set of performance indicators and the label assigned for the set of performance indicators; and
for each of one or more satellite terminals, determining, by the one or more computers, a network condition classification for the satellite terminal based on output that the trained machine learning model generates based on input of performance indicators for the satellite terminal.

* * * * *